April 1, 1958  E. F. STINSON  2,828,971
VEHICLE LANDING GEAR
Filed Feb. 23, 1955  2 Sheets-Sheet 1
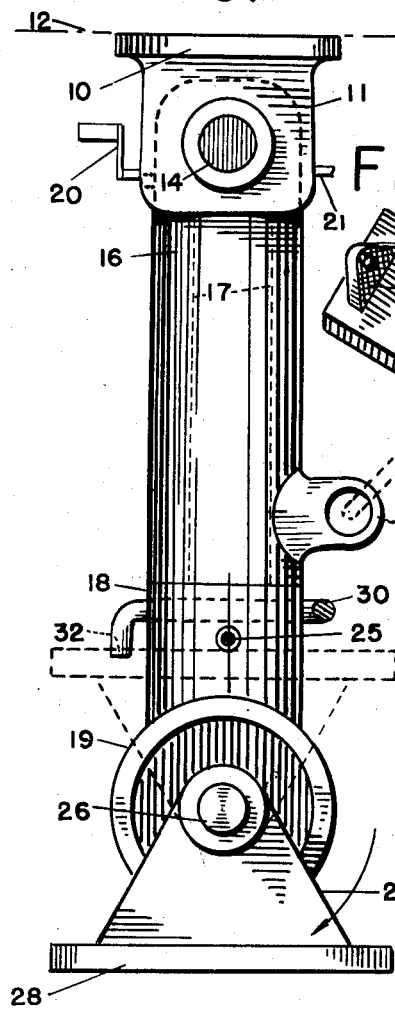
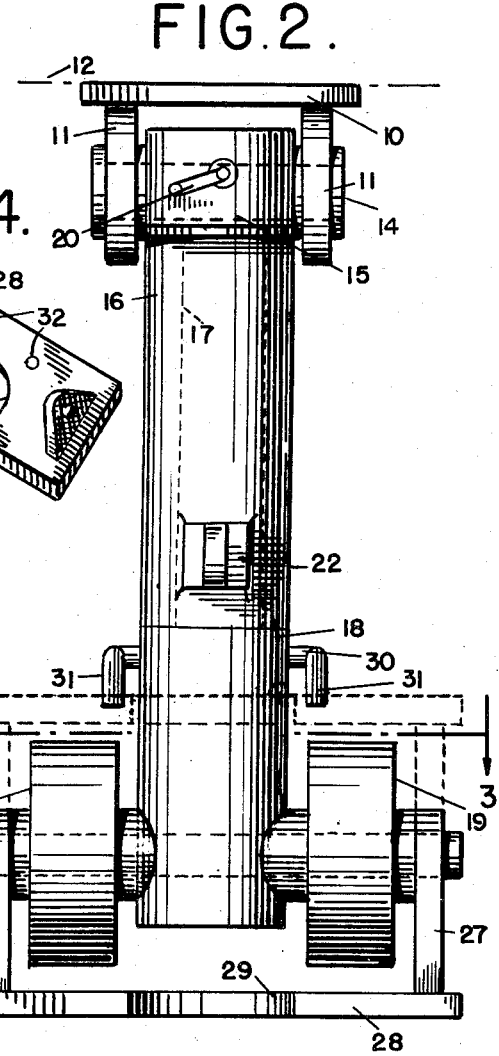
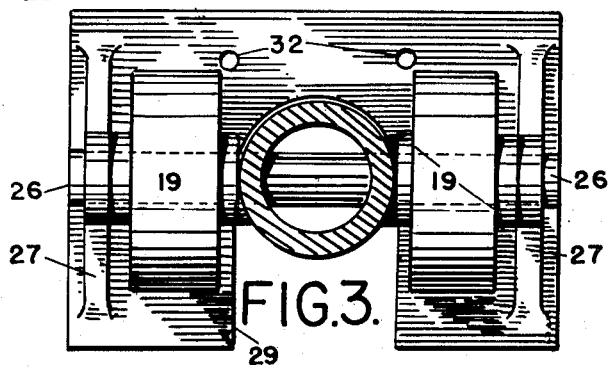
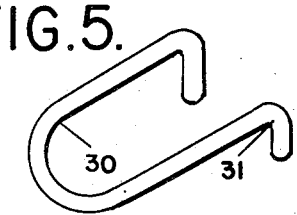
INVENTOR.
EDWIN F. STINSON
BY
ATTORNEY April 1, 1958 E. F. STINSON 2,828,971
VEHICLE LANDING GEAR
Filed Feb. 23, 1955 2 Sheets-Sheet 2
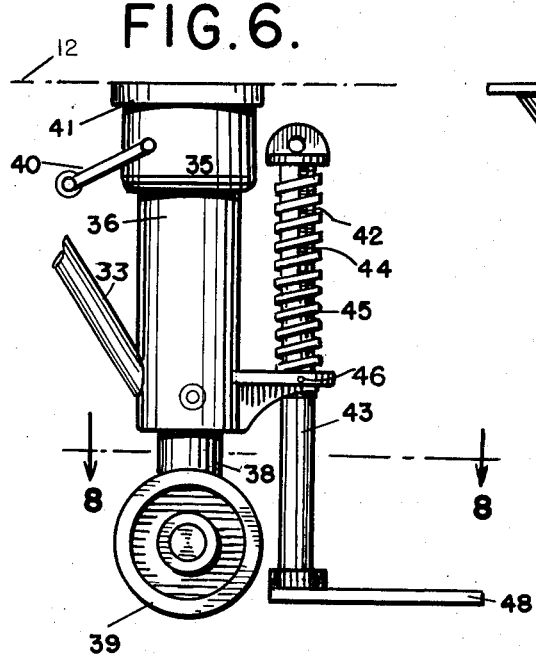
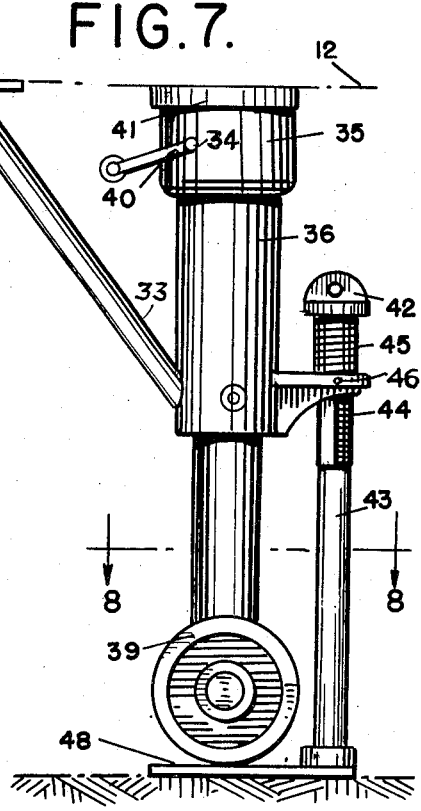
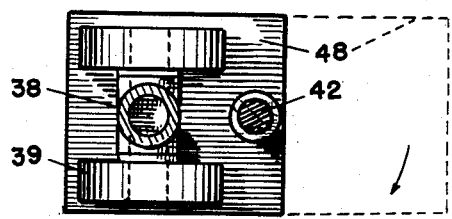
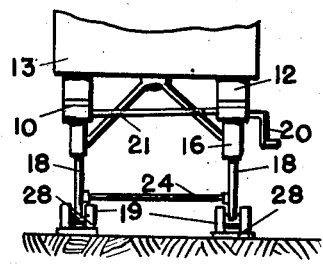
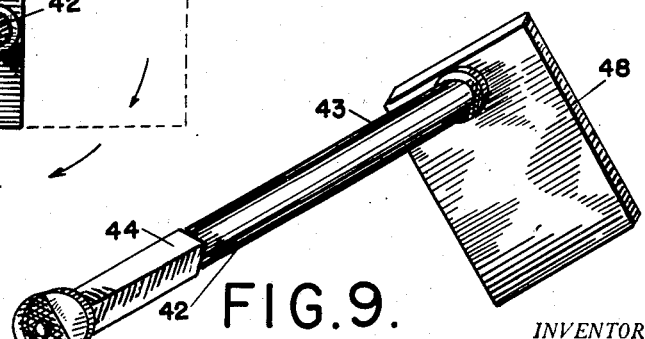
INVENTOR.
EDWIN F. STINSON
BY
ATTORNEY.

United States Patent Office 2,828,971
Patented Apr. 1, 1958

2,828,971
VEHICLE LANDING GEAR
Edwin F. Stinson, Philadelphia, Pa.
Application February 23, 1955, Serial No. 489,871
4 Claims. (Cl. 280—150.5)

This invention relates to motor vehicles and more particularly to a trailer truck that is combined detachably with a tractor unit. This type of trailer is commonly employed to carry loadings over the highway from one municipality to another. It is then allowed to stand while being unloaded and reloaded, with the tractor detached and moved away to another location. A landing gear mounted on the chassis of the trailer truck is erected by lowering its leg means to support the front end portion of the latter and maintain the trailer on a level plane as long as desirable. At the proper time the tractor is brought back, slipped into position under the front end of the trailer and allowed to carry it, when the landing gear is raised from contact with the terrain, out of the way, close to the chassis. In its present form, the trailer has difficulty in meeting some local situations due to the variations in terrain occurring where the vehicle is stabled. It is the purpose of this invention to overcome this by providing a new and improved landing gear designed to increase its effectiveness. Another object of this invention is to provide a new and improved landing gear having a swinging pan connected with it for placement under its dummy wheels where the terrain renders such desirable. A further object of this invention is to provide a new and improved landing gear having an auxiliary component optionally working with it to introduce a false foundation area under the dummy wheels of the gear to increase the surface area of the terrain contacted with, as well as prevent the trailer rolling when the tractor is detached from it.

Other objects of the invention will become apparent as it is more fully described.

The invention consists principally of a swinging pan adapted for placement under the dummy wheels of a landing gear for a truck trailer. The pan means is used where the terrain requires it and prevents the wheels from rolling after the trailer is stabled. The pan means is operated by a mechanism attached to the landing gear or chassis and actuated manually by the user. This is accomplished independently of the mechanism employed to lift and lower the leg or legs of the landing gear.

The landing pan is flat and of substantially larger area than that of the projected area of the wheels, so as to spread the weight on it, and make it less per square inch, and avoid concaved depressions, which the wheels tend to cause. The landing pan is adjustable with the leg and can be swung into position under the wheels at any time.

For better understanding of the invention and the objects thereof, reference is made to the accompanying drawings wherein a particular form of the invention is indicated by way of example. These drawings in conjunction with the following description illustrate the invention, outline its principles and explain its operation, while the claims attached herewith indicate the scope of the invention.

Figure 1 is a side elevation of a landing gear unit embodying this invention;

Figure 2 is a front view of Figure 1;

Figure 3 is a sectional plan view of Figure 2 taken on line 3—3 thereof;

Figure 4 is a perspective detail of the ground pan used in this embodiment;

Figure 5 is a perspective detail of the locking link used in this embodiment;

Figure 6 is a side elevation of a modified form of landing gear with its landing gear and pan lifted above the ground;

Figure 7 is a similar view of Figure 6 with the landing gear and pan lowered to rest on the ground;

Figure 8 is a sectional plan view taken on line 8—8 of Figures 6 and 7;

Figure 9 is a perspective detail of the ground pan; and

Figure 10 is a partial view of a trailer truck with the landing gear unit in dual form attached.

Similar reference characters refer to similar parts throughout the drawings.

In the drawings and more particularly in Figures 1 and 2; a single leg landing gear unit is indicated. It is however conventional to employ this unit with dual legs, one at each side of a trailer truck adjacent the location of the fifth-wheel plate. The dual arrangement is indicated in Figure 10 to make its general structure understood. The detail drawings however illustrate the single form, which appears to be sufficient since both legs of a dual unit are similar and symmetrical. They are however joined by lateral struts and a common shaft to operate the retracting mechanism of each simultaneously.

In the figures noted, a body flange member 10 including bearings and brackets 11 is adapted for bolting or other suitable attachment to the chassis 12 of a trailer truck 13. The bearings support a shaft 14 passing through the head 15 of a column 16 forming the main cylinder of a landing gear leg. The bearings enable the column to swing from a vertical to a horizontal position and vice versa. The head 15 contains the gears and mechanism for operating a screw member that telescopes a hollow plunger 17. The mechanism is of conventional construction and follows the principles already described and shown in previous patents on record in this art. The plunger has an enlarged base, 18, on its lower end that butts against the column 16 when raised. This base serves as a support for the rollers and dummy wheels 19 that are grounded when the leg is fully extended for stabilizing the truck when its tractor is removed. The internal retracting mechanism is not shown in detail as its form is well known to those skilled in the art, and does not appear to need detailed illustration. The handle 20 extends from the side of the head to the mechanism to operate the latter. In general the mechanism consists of bevel gears, one of which is mounted on a stationary shaft longitudinally disposed in the column. The shaft extends into screw threads formed on the interior surface of the hollow plunger 17, and as it rotates on its longitudinal axis, raises or lowers the plunger, depending on the direction it is turned. The rod 21 has the primary bevel gears keyed to it. To operate a dual set of these mechanisms this rod 21 is extended across the trailer truck from the handle 20 to the opposite or second head so that the mechanisms in both legs can be operated simultaneously. The column is arranged with an exterior lug 22 to which a brace 23 is attached. The brace is detachably connected to the lug on one end and to an eye-bolt attached to the underside of the chassis, on the other. This brace 23 is intended to take up the push and pull stresses involved when the landing gear unit is erected under the truck. A cross strut 24 (Figure 10) is adjustably screwed into sockets 25 on the bases 16 when dual landing legs are employed. The strut 24 is extended between the bases and keeps the rollers 19 aligned against lateral and torsional stresses.

The rollers 19 are mounted on a shaft 26 projected laterally through the base 18 which preferably is provided with ball or roller bearings for this duty. Also on the shaft 26 extended are a pair of brackets 27 that swing easily thereon. The brackets are welded to a flat plate 28. This plate is termed a landing pan and is arranged to swing under the rollers and rest on the terrain below them to take up the weight impressed on the landing legs when lowered to the ground.

The plate or pan 28 has a middle portion removed to provide an opening 29 that can encompass the base 18 when it is swung up in the position indicated by dotted lines in Figures 1 and 2. The plate or pan and brackets as an assembly is arbitrarily termed the landing pan. In order to keep the landing pan up, when not in use, below the rollers, it is kept locked in the dotted position by means of a locking link 30. This locking link consists of rod bent to embrace the base 18 and extends a pair of arms 31 down into holes 32 drilled in the plate or pan 28. This retains the landing pan in a position out of the way, but enables it to be released easily as required. The locking link can be chained to the lug 22 to prevent its loss, if desired.

The landing gear unit is ordinarily raised out of the way close to the chassis, while the trailer truck is travelling on the highway. The hinge arrangement of the body flange assembly permits this to be done, when the unit is in approximately horizontal position. The brace 23 is disconnected while this is done and is suitably supported.

In the modifications shown in Figures 6 and 7, the landing gear unit is of the stiff leg type and has a permanent brace 33 securing the column 36 in a rigid position. The column has a head 35 and flange 41 with mechanism similar to that mentioned in Figures 1 and 2, but without the hinge arrangement. The handle 40 and rod 34 serve the same purpose and the column 36 contains a telescoping plunger 37. A base portion on the plunger 38 supports the rollers 39. The landing pan in this modified form consists of a plate 48 suspended by a post 42. A bracket with a square hole through it, allows the circular portion 43 of the post to pass freely and rotatably through but its upper portion 44 of square cross section is engaged by the sides of the square hole and stays in four landing positions when lifted, rotated and dropped back into it. Thus the landing pan when lowered can be in position with its pan to the front or back or sides. When the landing pan is not in use, it is raised and faced backwardly as shown in Figure 6. When in use the plate 48 is rotated to the front so as to be under the rollers as in Figure 7. The operating mechanism is worked so as to force the telescoping plunger 38 downwardly. As the rollers lower, they push down on the plate 48 and use it as a base under them, as it reaches the ground. A coil spring 45 around the square portion of the post 42 tends to keep the landing plate up under resilient tension. It does not interfere with the operation of the plunger and its rollers. The plate 48 retains its position under the rollers as long as it is not raised with the latter with its post portion 44 out of the square hole and then turned on its circular portion. A pin 46 is insertable in the side of the column bracket in Figs. 6 and 7 to engage with the post 42 in holes (not shown) to hold it in the positions shown.

It is to be noted that the device, whichever style is used, provides for a landing pan placeable under its rollers or not, as the user may determine. The pan having a surface considerably greater than that afforded by the peripheries of the rollers, is able to provide a support for the trailer truck it is used on, able to stay unmired on soft ground, where the rollers could not. The arrangement is compact, simple and effective. It is not cumbersome because it is incorporated with the landing gear. It is readily manipulated, requiring no more than present efforts, in lowering and raising the landing gear, and is relatively inexpensive to make and include in present equipment.

While two forms of the invention have been illustrated herein, it is not desired to limit this application for patent to such forms, or in any other way, otherwise than limited by the scope of the claims, as it is appreciated that other forms could be made using the same principles and coming within the field of the claims.

I claim:

1. In combination with a landing gear including dual dummy wheels attached thereto of the class described, and attachable to a trailer chassis, a ground pan unit comprising a swinging pan form of relatively flat material and having an area ample enough to spread fully under the wheels and maintain them off the terrain and form a distinct and separate foundation for their support, a non-resilient mechanism for optional carrying said pan to and from said wheels to the foundation position and away from said position free of the wheels, said mechanism being disposed adjacent the landing gear and operable independently thereof, said pan being hinged to the axle of the wheels and having an opening in a predetermined portion thereof, to allow the pan to encompass and surround a greater portion of the peripheral border of the mechanism when in a position not acting as a foundation therefor.

2. A landing gear for attachment to the chassis of a trailer comprising in combination a telescopic leg including plural dummy wheel means mounted thereon adapted to assume one position close to the chassis and off the ground when telescopically retracted and a second position in contact with the ground and terrain when telescopically extended, a swinging pan of rectangular contour for placement under said means to provide more area of a non-rolling nature therefor when said leg is in its second position and thereby afford stability to said chassis, said pan maintaining said wheels out of contact with the terrain and means for flexibly attaching the pan to the leg to make the use of the pan under said wheel means optional, said means including a hinged member swingable from a predetermined portion of the leg and long enough to move the pan under and adjacent the wheel means in its second position and up close to the leg out of the way in its first position, said pan being flat and extendable fully under said means between it and the terrain, and including brackets to support it and straddle the end portion of the leg.

3. A landing gear unit for a trailer comprising in combination, a column swingingly attached to the chassis of the trailer, a plunger reciprocatable in said column having axle openings in the lower portion thereof, an axle passing through said openings at right angles to the axis thereof, a set of dummy wheels mounted on said axle and disposed on opposite sides of the plunger, a flat pan for full placement under said wheels to take up the weight of the load on said wheels and maintain an area of flat contact on the terrain greater than the projected area of the wheels, and means carried on the unit holding said pan adapted to swing it under the wheels to a horizontal plane and serve as a foundation on the terrain for the support of said load centered on the axis of the column when in a vertical position under the chassis and means for securing the said pan in plural relationship to the wheels.

4. The unit as recited in claim 3 and further characterized by being provided with an insertable member for removably maintaining the pan and last mentioned means a predetermined position in relation to said plunger.

References Cited in the file of this patent

UNITED STATES PATENTS

| 1,415,008 | Barber | May 9, 1922 |
| 2,033,207 | Schultz | Mar. 10, 1936 |
| 2,205,436 | Richards | June 25, 1940 |
| 2,595,453 | Gilmore | May 6, 1952 |
| 2,717,410 | Holloman | Sept. 13, 1956 |